3,634,379
ACRYLIC ANAEROBIC COMPOSITIONS CONTAINING A HYDROPEROXIDE AND A DIALKYL-PEROXIDE
Martin Hauser, West Hartford, Conn., assignor to Loctite Corporation, Newington, Conn.
No Drawing. Filed Oct. 2, 1969, Ser. No. 863,318
Int. Cl. C08f 3/64, 15/26
U.S. Cl. 260—89.5
11 Claims

ABSTRACT OF THE DISCLOSURE

Sensitivity in anaerobic sealants and adhesives to the surfaces to which they are applied is materially reduced by using as an initiator for polymerization a combination of a hydroperoxide and an organic peroxide.

BACKGROUND OF THE INVENTION

Anaerobic adhesives and sealants (hereinafter sometimes referred to jointly as "anaerobic compositions") are polymerizable materials, normally in the liquid state, the cure of which is inhibited by oxygen. They are sufficiently sensitive to oxygen that normal diffusion of oxygen from the vapor phase in a half-filled bottle, or diffusion through the sides of an air permeable container (such as low density polyethylene containers), provides sufficient contact with oxygen to keep the anaerobic sealant or adhesive in the uncured state. In the normal method of use, the anaerobic composition is placed between appropriate air impermeable surfaces (such as metal parts). Within a relatively short period of time, polymerization (cure) commences since the supply of the inhibiting oxygen has been terminated.

Anaerobic compositions have found wide applicability during the short period of time they have been commercially available. Their prime area of use is in the metal working field; metal surfaces effectively exclude oxygen and hence are particularly adaptable to use with anaerobic products. Certain problems are inherent in the use of anaerobic compositions to seal and bond metal surfaces however, because of the wide variety of surfaces which are encountered in industry today. In addition to the wide variety of metal substrates (iron, various steels, aluminum, copper, bronze, brass, etc.), one encounters various metal platings, e.g., nickel, zinc and cadmium, and an abundance of surface treatments, which encompass coatings of oil or other organic materials, as well as deposition of inorganic salts and other inorganic compounds on the surface of the metal. These surface treatments may be designed to improve the appearance of the product, make it inert to atmospheric oxygen, salt spray, or other corrosive atmospheres, or to serve some other protective function.

Anaerobic compositions generally are affected by the nature of the surfaces to which they are applied. Certain surface treatments tend to "activate" the anaerobic composition and accelerate its rate of cure to a considerable degree. For example, copper or cast iron surfaces are extremely active in this regard. On the other hand, some surfaces tend to "deactivate" or inhibit the cure of anaerobic compositions. Many of the coatings which are designed to provide resistance to corrosive atmospheres fall in this category.

There has been different approaches taken in an attempt to alleviate this problem of surface sensitivity. For example, latent polymerization accelerators can be added to the anaerobic compositions. These are substances which, while not materially affecting the stability of the liquid product in its uncured state, serve to increase the rate of cure once the curing process has been initiated. See, for example, U.S. Pats. 3,041,322, 3,046,262 and 3,218,-305 to V. K. Krieble, issued respectively on June 26, 1962, July 24, 1962, and Nov. 16, 1965. While latent accelerators tend to make anaerobic products cure more rapidly, they do not solve the problems caused by the existence of different rates of cure on the various surfaces. Unfortunately, the primary effect of the surfaces generally is not on the rate of cure, but rather on the time which is required to initiate it. Hence the inclusion of latent accelerators has not produced a more unified speed of cure.

Another approach has been to use a surface activator or "primer" in conjunction with the anaerobic adhesive or sealant. The primer is sprayed onto one or more of the surfaces to be sealed or bonded prior to application of the anaerobic composition. See, e.g., U.S. Pat. 3,203,941 to V. K. Krieble, issued Aug. 31, 1965. Some degree of success has been achieved by the use of surface primers since they provide a more uniform surface in terms of activity for use in conjunction with the sealant or adhesive. But this has not met with universal acceptance since it requires the use of two components, thus eliminating the single component advantage of anaerobic adhesives and sealants. In addition, further assembly time is required since the primers generally are dissolved in volatile solvents and the solvent must be allowed to evaporate before the anaerobic composition can be applied. Hence, particularly, in production line applications, surface primers present significant problems.

Heat curing also can be used to produce more rapid cures on all surfaces. However, the ability to cure at room temperature is a major advantage of the anaerobic compositions. Hence the use of a heat cure, which is both time consuming and expensive, is not a desirable solution to the problem.

An anaerobic sealant which both unified and accelerated the rate of cure on all surfaces, and eliminated the need for outside stimulus to obtain satisfactory cure speed, would be an extremely valuable product and a major improvement in the chemistry of anaerobic compositions.

THE INVENTION

This invention concerns anaerobic compositions which contain a polymerization initiator system containing both a hydroperoxide and an organic peroxide. Generally the hydroperoxide in the mixture is an organic hydroperoxide, and the primary polymerizable monomer of the anaerobic composition is a polymerizable acrylate ester. The invention also concerns a method for improving standard anaerobic compositions comprising an acrylate ester and a hydroperoxide, by incorporating therein a small but effective amount of an organic peroxide.

In another aspect of this invention, a process is presented for the bonding of all or nearly all air impervious surfaces by the application to at least one of said surfaces of a composition of the type described in the preceding paragraph, following which the surfaces are placed in contact until the anaerobic composition has cured to seal or bond the respective surfaces.

DISCUSSION OF THE INVENTION AND ITS PREFERRED EMBODIMENTS

The use of the compositions and processes of this invention offer significant advantages over all known prior art anaerobic compositions. Essentially all prior art anaerobic compositions were greatly affected by most metal surfaces and, on the commercial level, generally were limited to use on active metal surfaces, as indicated previously. Use on most other surfaces required the use of either a surface primer or heat if reasonably short cure times were required.

The compositions of the invention described herein offer twi significant advantages with regard to prior art anaerobic compositions. First, these materials can be used successfully on a large number of surfaces on which prior art anaerobic compositions could be used with only marginal success, or on which they could not be used at all without the aid of heat or surface activators. Typical surfaces on which this difference in performance can be demonstrated are zinc and cadmium plating, glass, and such plastics as polyethylene and poly(hexamethyleneadipamide).

Second, the compositions of this invention significantly narrow the difference in the time of cure on various surfaces. For example, the difference in the speed of cure for the more active surfaces versus the speed of cure for a typically inactive surface for prior art compositions could be 24 hours or more. The similar figure for the compositions of this invention generally is reduced to a fraction of that time, commonly to a difference of about two to four hours or less.

The hydroperoxide which is used in the compositions of this invention can be any of the hydroperoxides well known in the art. While hydrogen peroxide can be used, it is preferable to use an organic hydroperoxide, and most preferably those organic hydroperoxides having the formula R'OOH wherein R' is a hydrocarbon radical containing up to about 18 carbon atoms, and most desirably an alkyl, aryl, or aralkyl radical containing from 1 to about 12 carbon atoms. Naturally, R' can have any substituent or linkage which does not adversely affect the hydroperoxide for its intended use herein. Typical examples of such hydroperoxides are cumene hydroperoxide, t-butyl hydroperoxide and p-menthane hydroperoxide. Other hydroperoxides may be formed by a liquid phase oxygenation of various hydrocarbons, such as butene, cetane, and cyclohexene, or of ethers, ketones and o-formate esters. Likewise, certain peroxy compounds which hydrolyze or decompose to form hydroperoxides in situ may be used successfully. Examples of such compounds are t-butyl perbenzoate and dihydroxyheptyl peroxide.

The organic peroxides which can be used in the compositions of this invention also are of broad scope. Preferably, the organic peroxides are of the formula $R^2OOR^3$, where each of $R^2$ and $R^3$ is a hydrocarbon radical containing up to 18 atoms, and most preferably alkyl hydrocarbon radicals containing up to about 12 carbon atoms. Naturally, $R^2$ and $R^3$ can be similar or dissimilar, and can contain any substituent or linkage which does not adversely effect the peroxides for the intended use herein. Typical examples of peroxides which have been found useful are 2,5-dimethyl-2,5-di-t-butylperoxyhexane, dicumylperoxide and di-t-butylperoxide. These materials, di-alkyl peroxides, are the most highly preferred peroxides which are available for use in these compositions.

As indicated above, polymerizable monomers generally incorporated in anaerobic compositions are polymerizable acrylate esters. As used herein, "acrylate ester" includes α-substituted acrylate homologs and analogs, such as methacrylates, ethacrylates and chloroacrylates. The acrylate ester monomers need not be in the pure state, but may comprise commercial grades in which stabilizers such as hydroquinones and quinones are included. As used herein the term "polymerizable acrylate ester" includes not only the acrylate ester monomers in the pure and impure state, but also compositions which contain these monomers in amounts sufficient to impart to the overall compositions the polymerization characteristics of acrylate esters. It is also within the scope of the present invention to obtain modified characteristics for the cured composition by the utilization of one or more acrylate ester monomers with other unsaturated monomers, such as unsaturated hydrocarbons or unsaturated esters.

Of particular utility are di- and other polyacrylate esters. Because of their ability to form cross-linked polymers, they have more highly desirable sealant and adhesive properties. However monoacrylate esters can be used, particularly if the alcoholic portion of the ester contains a hydroxy or amino group, or other reactive substituent which serves as a site for potential intermolecular bonding.

Monoacrylate esters which have been found adaptable to use in anaerobic systems are those having an acrylate moiety of the formula

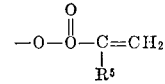

wherein $R^5$ is a member selected from the group consisting of hydrogen, halogen, and lower alkyl of 1–4 carbon atoms, and an alcoholic moiety which contains a reactive center capable of promoting intermolecular bonding, said reactive center being selected from the group consisting of labile hydrogen, the hetero atom of a heterocyclic ring, hydroxy, amino (preferably alkyl substituted amino), cyano and halogen radicals. Examples of monomers of this type are hydroxyethylmethacrylate, cyanoethylacrylate, t-butylaminoethylmethacrylate, cyclohexylmethacrylate and glycidylmethacrylate.

One of the most preferable groups of polyacrylate esters which can be used in the compositions disclosed herein are polyacrylate esters which have the following general formula:

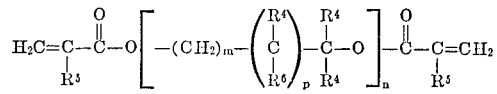

wherein $R^4$ represents a radical selected from the group consisting of hydrogen, lower alkyl of from 1 to about 4 carbon atoms, hydroxy alkyl of from 1 to about 4 carbon atoms, and

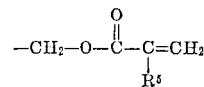

$R^5$ is a radical selected from the group consisting of hydrogen, halogen, and lower alkyl of from 1 to about 4 carbon atoms; $R^6$ is a radical selected from the group consisting of hydrogen, hydroxyl, and

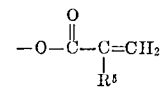

$m$ is an integer equal to at least 1, e.g., from 1 to about 15 or higher, and preferably from 1 to about 8 inclusive; $n$ is an integer equal to at least 1, e.g., 1 to about 20 or more; and $p$ is one of the following: 0, 1.

The polymerizable polyacrylate esters utilized in accordance with the invention and corresponding to the above general formula are exemplified by but not restricted to the following materials: di-, tri- and tetraethylene glycol dimethacrylate, dipropylene glycol dimethacrylate, polyethylene glycol dimethacrylate, di(pentamethylene glycol) dimethacrylate, tetracethylene glycol diacrylate, tetraethylene glycol (chloroacrylate), diglycerol diacrylate, diglycerol tetramethacrylate, tetramethylene dimethacrylate, ethylene dimethacrylate, neopentyl glycol diacrylate and trimethylol propane triacrylate.

A second class of preferred acrylate esters are those which are formed by the reaction of: (a) an acrylate ester containing an active hydrogen atom in the alcoholic moiety of the ester; with (b) an organic polyisocyanate. Compositions of this general type are disclosed in U.S. Pat. 3,425,988 to Gorman and Toback, issued Feb. 4, 1969. Preferably, the active hydrogen is the hydrogen of the hydroxy or a primary or secondary amine substituent on the alcoholic moiety of the ester, and the polyisocyanate is a diisocyanate. Naturally, an excess of the acrylate ester should be used to insure that each isocyanate functional group in the polyisocyanate is substituted.

The most perferred of the acrylate esters used in the manner described in the preceding paragraph are those in which the acrylate ester is an alkyl or aryl acrylate ester, most preferably having the formula $$H_2C=\overset{R^5}{\underset{|}{C}}-\overset{O}{\underset{||}{C}}-O-R^7-X-H$$

wherein X is selected from the group consisting of —O— and $$-\overset{R^8}{\underset{|}{N}}-$$

wherein $R^8$ is hydrogen or a hydrocarbon radical containing up to about 10 carbon atoms, and preferably is selected from the group consisting of hydrogen and alkyl or aralkyl radicals of 1 through about 10 carbon atoms; $R^5$ is as defined above; and $R^7$ is a divalent organic radical selected from the group consisting of alkylene of 1 through about 10 carbon atoms, and divalent aromatic radicals containing up to about 14 carbon atoms, preferably phenylene, biphenylene and naphthalene. Naturally $R^7$ and $R^8$ can contain any substituents or linkages which do not adversely affect the molecule for its intended use herein.

Typical polyisocyanates which can be reacted with the above acrylate esters to form polyacrylate monomers are toluene diisocyanate, 4,4'-diphenyl diisocyanate, dianisidine diisocyanate, cyclohexylene diisocyanate, 2-chloropropane diisocyanate, 4,4'-di-phenylmethane diisocyanate, 2,2'-diethylether diisocyanate, 3-(dimethylamino)pentane diisocyanate, tetrachlorophenylene diisocyanate-1,4, and trans-vinylene diisocyanate. Still other polyisocyanates that may be used are the higher molecular weight polyisocyanates obtained by reacting an excess of any of the above described isocyanates with polyamines containing terminal, primary and secondary amine groups, or polyhydric alcohols, for example, the alkane and alkene polyols such as glycerol, 1,2,6-hexanetriol, 1,5-pentanediol, ethylene glycol, polyethylene glycol, 4,4'-dihydroxydiphenyldimethylmethane, and condensation products of alkylene oxides with 4,4'-dihydroxydiphenyldimethylmethane.

Other acceptable monomers which can be used in the compositions disclosed herein are acrylate terminated epoxy or ester units, or low polymers thereof. Typical exemplary structures which have been prepared embodying these concepts are the following:

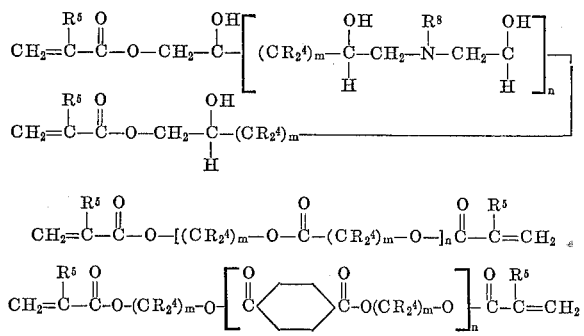

wherein $R^4$, $R^5$, $R^8$, $m$ and $n$ are as defined above.

Naturally any of the above-described acrylate and polyacrylate ester monomers can be used in combination if desired. Many of the higher molecular weight acrylate esters described above are extremely viscous and advantageously are mixed (diluted) with a low viscosity acrylate ester, such as an alkyl or hydroxyalkyl acrylate ester.

In addition to the monomer and the initiator system in the anaerobic composition, one or more polymerization accelerators commonly are included as well. These are materials which, while not adversely affecting commercial shelf stability of the product, do serve to reduce the time of cure once polymerization has been initiated. There are a number of known accelerators which have been disclosed for use in anaerobic compositions. Organic amides, such as formamide and succinamide are examples. Tertiary amines, such as tributylamine and triethylamine, also are still used quite widely.

The accelerator system found most highly desirable for use in the anaerobic compositions of this invention, are those which contain an organic sulfimide. For purposes of this invention, the organic sulfimide can be described as an organic compound containing the group —SO₂—NH—CO—. While the above sulfimide group can be in open chain form, it preferably is part of a heterocyclic ring. The most preferable sulfimide for use in the compositions of this invention is benzoic sulfimide.

In highly preferred compositions, the accelerator system comprises the combination of an organic sulfimide and an organic amine. To form the highly preferred embodiment of this invention, the nitrogen atom of the organic amine must have an available electron pair and be sufficiently nucleophilic to co-act with the organic sulfimide to produce a speed of cure significantly greater than comparable amounts of either of the two compounds separately. The adaptability of a particular organic amine in this regard easily can be determined with a minimum of routine testing by preparing sample formulations and testing them, e.g., on nuts and bolts of various metals, as is more fully described below. As guidelines the following classes of organic amines have been found useful in this regard: (a) heterocyclic secondary amines, and preferably heterocyclic secondary amines wherein the heterocyclic ring is hydrogenated, such as pyrrolidine, piperazine and 1,2,3,4 - tetrahydroquinoline; (b) N,N-dialkylarylamines, such as those represented by the following general formula:

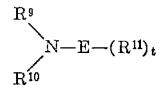

wherein E represents a carbocyclic aromatic nucleus, preferably selected from the group consisting of phenyl and naphthyl radicals; $R^9$ and $R^{10}$ are lower alkyl radicals of 1 to 4 carbon atoms, inclusive; $t$ is one of the following: 0, integer equal to from 1 to 5 inclusive; and $R^{11}$ is a member selected from the groups consisting of lower alkyl and lower alkoxy radicals of 1 to 4 carbon atoms inclusive, provided that when an $R^{11}$ radical is in the ortho position, $t$ is greater than 1. Examples of suitable N,N-dialkylarylamines are N,N-dimethyl-p-toluidine, N,N-dimethyl aniline and N,N-diethyl-p-toluidine.

In addition to the above described materials a large number of optional ingredients are available for use in anaerobic compositions and may be used to impart commercially desirable characteristics to the final product. Frequently the use of, e.g., dyes, thickeners, thixotropic agents, plasticizers or adhesive agents are desirable. While the improved quality of starting materials has reduced the need for stabilizers (inhibitors), it usually is desirable to incorporate a small amount of such a material in the anaerobic composition. Typical stabilizers are quinones, hydroquinones, and sterically hindered phenolic compounds.

The levels of use of the various components discussed above can vary within wide ranges. The initiator system can be used at any level which does not make the anaerobic composition unstable under normal conditions of storage and use. This level is less than about 20% by weight of the composition, and generally is less than about 15% by weight. The preferred range is between about 2% and about 12% by weight, and most preferably between about 3% and about 10% by weight. The relative amounts of peroxide and hydroperoxide also can vary within wide limits. The hydroperoxide usually should not be less than about 0.3% by weight, and the peroxide usually should not be less than about 1.0% by weight.

With regard to the polymerization accelerators, the broad range of use is from about 0.2% by weight to about 8% by weight of the composition. The sulfimide commonly is used at from about 0.2% to about 5.0% by weight. When the highly preferred combination of an organic sulfimide and a reactive organic amine is used, the total weight of sulfimide and amine generally comprises from about 0.4% to about 6.0% by weight of the anaerobic composition, and each of the sulfimide and the amine comprises at least about 0.2% by weight of the composition. Preferably, the sulfimide comprises at least about 0.3%, and the amine at least about 0.2% by weight of the composition.

The monomer usually comprises the bulk of the balance of the anaerobic composition, and generally comprises from about 55% to about 95% by weight of the anaerobic composition. The various optional ingredients (thickeners, plasticizers, etc.) can be used at any level which does not affect the anaerobic composition adversely for its intended purpose. The optional ingredients generally do not comprise more than about 30% by weight of the composition, and preferably do not comprise more than about 15% of its weight.

In use the anaerobic compositions described herein need only be applied to the surfaces to be sealed or bonded, and the surfaces then placed in an abutting relationship until the anaerobic composition has cured to perform the intended sealing or bonding function. It has been found that essentially all metal surfaces can be effectively bonded by the composition of this invention within one hour, and generally in substantially less time. A large number of non-metallic surfaces also can be bonded within about one hour, and only in isolated instances will surfaces of any type be found which will not be bonded or sealed within two to three hours. Eamples of non-metallic surfaces which have been found to have been bonded in two hours or less were glass, polystyrene, polyvinylchloride, acrylonitrile/butadiene/styrene and poly(hexamethyleneadipamide). Most of these surfaces have been generally considered to be difficultly bonded or sealed with anaerobic materials in any time period, much less within the short periods of time described herein. With regard to other non-porous surfaces, comparable speeds of cure may be expected. The only surfaces on which cure conceivably will not take place, or on which extended periods of time will be required, are those surfaces wherein the surface material itself serves to inhibit free radical polymerization.

EXAMPLES

The following examples are given to demonstrate the preparation and use of compositions within the scope of the invention described herein. The examples are intended to be exemplary only, and are not intended to be limitations upon the scope of this invention. Unless specifically stated to the contrary, all ratios and percentages are on a weight basis.

Example I

Anaerobic Composition I was prepared by mixing the following ingredients in the approximate weight percentages listed:

polyethyleneglycol dimethacrylate (average molecular weight=330)—85.4%
2,5-dimethyl-2,5-di-t-butylperoxyhexane—10.0%
t-butyl hydroperoxide—0.4%
benzoic sulfimide—4.0%
N,N-diethyl-p-toluidine—0.2%
p-benzoquinone—100 parts per million A portion of this composition was stored and tested periodically in an accelerated aging test designed to determine whether the product would be stable over an extended period of time. The test involved placing approximately two milliliters of the composition in a standard 10 millimeter test tube, and immersing the test tube in a constant temperature water bath maintained at 82° C. The time when the compositions cured was noted. Thereafter the composition was tested from time to time in the same manner to determine whether the product was becoming less stable, as evidenced by shorter cure times in the 82° C. bath. No adverse change in stability was noted over a period of several months, indicating the composition possessed commercial shelf stability.

Subsequently, the performance of Anaerobic Composition I was evaluated on various surfaces. Several drops of the sealant were placed on the threads of each of a number of iron, aluminum, zinc plated and cadmium plated nuts and bolts, and the nuts and bolts were assembled by screwing the nut onto the bolt until about three threads of the bolt were left exposed below the nut.

Fifteen, thirty and sixty minutes thereafter the assemblies were tested by attempting to turn the nut relative to the bolt, and the time was noted when the nut could not be moved by hand. This time, denoted the "fixture time," indicates when substantial cure has taken place. During polymerization the composition passes rapidly from the liquid to the plastic or solid state, and hence the "fixture time" can be determined with reasonable precision and reproducibility. A similar test was run on 1" x 4" glass slides by placing a few drops of the composition on one end of a first glass slide, and placing a second slide in an aligned, overlapping relationship, with about a one inch overlap. The time when one slide could not be moved relative to the other was denoted the "fixture time" in this test.

The results of the test were as follows:

TABLE I

| Surface: | Fixture time (min.) |
|---|---|
| Iron | 15 |
| Aluminum | 60 |
| Zinc plate | 30 |
| Cadmium plate | 30 |
| Glass | 60 |

Example II

A series of anaerobic compositions identified as Anaerobic Compositions II through Anaerobic Composition VI were prepared. The components and weight percentages were the same as in Anaerobic Composition I, except that various combinations of peroxide and hydroperoxide initiators were used. The peroxide and hydroperoxide of the respective compositions is presented in Table II below.

TABLE II

| Anaerobic composition | Peroxide | Hydroperoxide |
|---|---|---|
| II | 2,5-dimethyl-2,5-di-t-butyl-peroxyhexane | Cumene hydroperoxide. |
| III | do | p-Methane hydroperoxide. |
| IV | Dicumyl peroxide | t-Butyl hydroperoxide. |
| V | Di-t-butyl peroxide | Do. |
| VI | Dicumyl peroxide | Cumene hydroperoxide. |

Anaerobic Compositions II through VI then were tested in the stability test of Example I. The results indicated that each of Anaerobic Compositions II through VI possessed commercial shelf stability. Thereafter, the "fixture times" for these compositions were determined on iron, zinc plated and cadmium plated nuts and bolts by the procedure described in Example I above. The results of these tests are presented in Table III below.

TABLE III

| | Fixture time for anaerobic composition (min.) | | | | |
|---|---|---|---|---|---|
| Surface | II | III | IV | V | VI |
| Iron | 30 | 30 | 15 | 15 | 30 |
| Zinc | 30 | 30 | 30 | 30 | (1) |
| Cadmium | 30 | 30 | 60 | 30 | (1) |

1 Not tested

Example III

Anaerobic Compositions VII, VIII and IX were prepared by mixing the following ingredients in the approximate weight percentages listed below:

TABLE IV

| Component | Anaerobic composition |  |  |
|---|---|---|---|
|  | VII | VIII | IX |
| Polyethyleneglycol dimethacrylate of Example I | 87.5 | 90.7 | 90.1 |
| 2,5-dimethyl-2,5-di-t-butylperoxyhexane | 7.8 | 3.3 | 5.5 |
| t-Butylhydroperoxide | 1.0 | 2.3 | 1.7 |
| Benzoic sulfimide | 3.0 | 3.0 | 2.2 |
| N,N-diethyl-p-toluidine | 0.7 | 0.7 | 0.5 |
| p-Benzoquinone, p.p.m. | 100 | 100 | 100 |

Anaerobic Compositions VII, VIII and IX were tested for stability by the method described in Example I, and were found to possess commercial shelf stability. These same compositions were then tested on iron, zinc plated and cadmium plated nuts and bolts, again using the test described in Example I. The "fixture time" was determined, testing the assemblies at fifteen, thirty and sixty minutes. The results of the test are presented in the following table:

TABLE V

| Surface | Fixture time for anaerobic composition (min.) | | |
|---|---|---|---|
|  | VII | VIII | IX |
| Iron | 15 | 15 | 15 |
| Zinc | 30 | 30 | 30 |
| Cadmium | 30 | 60 | 30 |

Example IV

Anaerobic Composition I of Example I, above, was tested on various plastic surfaces. The surfaces and the corresponding "fixture time" are presented in Table VI.

TABLE VI

| Surface: | Fixture time (min.) |
|---|---|
| Polyvinyl chloride | 60 |
| Poly(hexamethyleneadipamide) | 120 |
| Acrylonitrile/butadiene/styrene | 60 |
| Polystyrene | 60 |

I claim:

1. An anaerobic composition which consists essentially of: (1) a polymerizable acrylate ester monomer selected from the group consisting of (a) polyacrylate ester monomers and (b) monoacrylate ester monomers wherein the alcoholic moiety of the ester contains a reactive center selected from the class consisting of labile hydrogen, the hetero atom of a heterocyclic ring, hydroxy, amino, cyano halogen groups; and (2) less than 20% by weight of said anaerobic composition of a polymerization system for said monomer comprising a hydroperoxide and a dialkyl peroxide, said hydroperoxide comprising not less than about 0.3% by weight of said anaerobic composition, and the dialkyl peroxide comprising not less than about 1.0% by weight of said anaerobic composition.

2. The anaerobic composition of claim 1 which contains as an additional ingredient an organic amine.

3. The anaerobic composition of claim 1 which contains as an additional ingredient an organic sulfimide.

4. The anaerobic composition of claim 3 which contains as an additional ingredient, an organic amine selected from the group consisting of heterocyclic secondary amines and N,N-dialkylarylamines.

5. The anaerobic composition of claim 4 wherein the hydroperoxide is an organic hydroperoxide containing up to about 18 carbon atoms, and the dialkyl peroxide has the formula $R^2OOR^3$ wherein each of $R^2$ and $R^3$ is a hydrocarbon radical containing up to about 18 carbon atoms.

6. The anaerobic composition of claim 1 wherein the polymerizable acrylate ester is a polyacrylate ester having the following general formula:

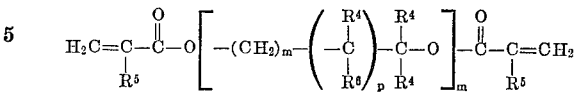

wherein $R^4$ represents a radical selected from the group consisting of hydrogen, lower alkyl of from 1 to about 4 carbon atoms, hydroxy alkyl of from 1 to about 4 carbon atoms, and

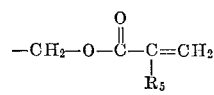

$R^5$ is a radical selected from the group consisting of hydrogen, halogen, and lower alkyl of from 1 to about 4 carbon atoms; $R^6$ is a radical selected from the group consisting of hydrogen, hydroxyl, and

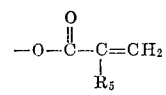

$m$ is an integer equal to from 1 to about 15; $n$ is an integer equal to from 1 to about 20; and $p$ is one of the following: 0, 1.

7. An anaerobic composition consisting essentially of: (1) a polymerizable acrylate ester monomer selected from (a) polyacrylate ester monomers and (b) monoacrylate ester monomers wherein the alcoholic moiety of the ester contains a reactive center selected from the class consisting of labile hydrogen, the hetero atom of a heterocyclic ring, hydroxy, amino, cyano and halogen groups; (2) less than 20% by weight of said anaerobic composition of a polymerization initiator system comprising a hydroperoxide and a dialkyl peroxide, said hydroperoxide comprising not less than about 0.3% by weight of said anaerobic composition, and the dialkyl peroxide comprising not less than about 1.0% by weight of said anaerobic composition; and (3) from about 0.4% to about 6.0% by weight of said anaerobic composition of a mixture of polymerization accelerators, said mixture comprising an organic sulfimide and an organic amine wherein each of said sulfimide and said amine comprise at least about 0.2% by weight of the anaerobic composition.

8. The anaerobic composition of claim 7 wherein the organic amine is selected from the group consisting of heterocyclic secondary amines and N,N-dialkyl arylamines having the following general formula:

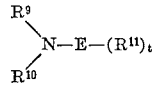

wherein E represents a carbocyclic aromatic nucleus; $R^9$ and $R^{10}$ are lower alkyl radicals of 1 to 4 carbon atoms, inclusive; $t$ is one of the following: 0, integer equal to from 1 to 5, inclusive; and $R^{11}$ is a member selected from the groups consisting of lower alkyl and lower alkoxy radicals of 1 to 4 carbon atoms, inclusive, provided that when an $R^{11}$ radical is in the ortho position, $t$ is greater than 1.

9. The anaerobic composition of claim 8 wherein the hydroperoxide is selected from the class consisting of cumene hydroperoxide, t-butyl-hydroperoxide and p-menthane hydroperoxide; and the dialkyl peroxide is selected from the class consisting of 2,5-dimethyl-2,5-di-t-butylperoxyhexane, dicumyl peroxide and di-t-butylperoxide.

10. The anaerobic composition of claim 7 wherein the polymerization initiator system comprises less than about 15% by weight of said anaerobic composition.

11. A process for sealing surfaces which comprises applying an anaerobic composition to at least one of said surfaces, and placing said surfaces in an abutting relationship until the anaerobic adhesive has cured, said anaerobic composition consisting essentially of (1) a polymerizable acrylate ester monomer selected from (a) polyacrylate ester monomers and (b) monoacrylate ester monomers wherein the alcoholic moiety of the ester contains a reactive center selected from the class consisting of labile hydrogen, the hetero atom of a heterocyclic ring, hydroxy, amino, cyano and halogen groups; (2) less than 20% by weight of said anaerobic composition of a polymerization initiator system comprising a hydroperoxide and a dialkyl peroxide, said hydroperoxide comprising not less than about 0.3% by weight of said anaerobic composition, and said dialkyl peroxide comprising not less than about 1.0% by weight of said anaerobic composition; and (3) from about 0.4% to about 6.0% by weight of said anaerobic composition of a mixture of polymerization accelerators, said mixture comprising an organic sulfimide and an organic amine wherein each of said sulfimide and said amine comprise at least about 0.2% by weight of the anaerobic composition.

References Cited
UNITED STATES PATENTS

| | | | |
|---|---|---|---|
| 2,444,655 | 7/1948 | Kroeker et al. | 260—89.5 |
| 3,043,820 | 7/1962 | Krieble | 260—89.5 |
| 3,046,262 | 7/1962 | Krieble | 260—89.5 |
| 3,300,547 | 1/1967 | Gorman | 260—89.5 |

HARRY WONG, JR., Primary Examiner

U.S. Cl. X.R.

117—124, 132, 138.8; 260—78.4, 78.5, 80.3, 85.5, 86.1, 88.3, 88.7, 89.7